United States Patent [19]

Prunier, Jr.

[11] Patent Number: 4,745,092
[45] Date of Patent: May 17, 1988

[54] STRENGTHENED CORDIERITE HAVING MINOR AMOUNTS OF CALCIA

[75] Inventor: Arthur R. Prunier, Jr., Midland, Mich.

[73] Assignee: The Dow Chemical Company, Midland, Mich.

[21] Appl. No.: 42,996

[22] Filed: Apr. 27, 1987

[51] Int. Cl.$^4$ .............................................. C04B 35/04
[52] U.S. Cl. ...................................... 501/119; 501/153; 501/154; 501/108
[58] Field of Search ................. 501/118, 119, 55, 153, 501/154, 108

[56] References Cited

U.S. PATENT DOCUMENTS

| | | | |
|---|---|---|---|
| 2,599,184 | 6/1952 | Lathe | 106/62 |
| 2,731,355 | 1/1956 | Skinner | 106/62 |
| 3,230,101 | 1/1966 | Alper et al. | 106/62 |
| 3,365,314 | 1/1968 | Sack | 106/39 |
| 3,380,838 | 4/1968 | Sack | 106/39 |
| 3,450,546 | 6/1969 | Stong | 106/39 |
| 3,458,329 | 7/1969 | Owens et al. | 106/39 |
| 3,473,890 | 10/1969 | Reinhardt et al. | 23/110 |
| 3,480,452 | 11/1969 | Fleischner et al. | 106/39 |
| 3,540,880 | 11/1970 | Spedden et al. | 75/109 |
| 3,567,472 | 3/1971 | Bratton | 106/39 |
| 3,585,054 | 6/1971 | Karstetter | 106/39 |
| 3,607,790 | 9/1971 | Pitha | 252/516 |
| 3,715,196 | 2/1973 | Montierth | 65/33 |
| 3,744,984 | 7/1973 | Sato | 65/22 |
| 3,753,746 | 8/1973 | Koerner | 106/58 |
| 3,769,044 | 10/1973 | Horton | 106/38.3 |
| 3,824,196 | 7/1974 | Benbow et al. | 252/455 R |
| 3,859,405 | 1/1975 | Horton | 264/49 |
| 3,880,969 | 4/1975 | Latos | 264/44 |
| 3,883,337 | 5/1975 | Helgesson et al. | 65/31 |
| 3,885,977 | 5/1975 | Lachman et al. | 106/62 |
| 3,912,526 | 10/1975 | Clark | 106/55 |
| 3,923,940 | 12/1975 | Hujii et al. | 264/59 |
| 3,926,648 | 12/1975 | Miller | 501/69 |
| 3,927,155 | 12/1975 | Jaeger et al. | 264/6 |
| 3,930,522 | 1/1976 | Turner | 138/111 |
| 3,943,994 | 3/1976 | Cleveland | 165/10 |
| 3,954,672 | 5/1976 | Somers et al. | 252/455 R |
| 3,958,058 | 5/1976 | Elmer | 428/220 |
| 3,967,971 | 7/1976 | Eppler | 106/45 |
| 3,979,216 | 9/1976 | Fritsch, Jr. | 106/62 |
| 3,988,405 | 10/1976 | Smith et al. | 264/63 |
| 3,991,149 | 11/1976 | Hurwitt | 264/63 |
| 4,015,048 | 3/1977 | Martin | 501/62 |
| 4,063,955 | 12/1977 | Fritsch, Jr. et al. | 106/39.6 |
| 4,080,414 | 3/1978 | Anderson et al. | 264/41 |
| 4,104,345 | 8/1978 | Anderson | 264/43 |
| 4,125,408 | 11/1978 | Pieper | 106/62 |
| 4,142,879 | 3/1979 | Fritsch, Jr. et al. | 501/9 |
| 4,180,538 | 12/1979 | Morikawa et al. | 264/63 |
| 4,183,991 | 1/1980 | Smiley et al. | 428/220 |
| 4,194,917 | 3/1980 | Sakemi et al. | 106/62 |
| 4,209,477 | 6/1980 | Yanagida et al. | 264/62 |
| 4,235,855 | 11/1980 | Cleveland | 423/327 |
| 4,266,978 | 5/1981 | Prochazka | 106/39.5 |
| 4,268,311 | 5/1981 | Verdow | 501/154 |
| 4,279,849 | 7/1981 | Ogawa et al. | 264/63 |
| 4,280,845 | 7/1981 | Matsuhisa et al. | 106/62 |
| 4,283,360 | 8/1981 | Henmi et al. | 264/63 |
| 4,292,080 | 9/1981 | Martin | 501/4 |
| 4,295,892 | 10/1981 | Matsuhisa et al. | 501/120 |
| 4,300,953 | 11/1981 | Lachman | 501/112 |

(List continued on next page.)

FOREIGN PATENT DOCUMENTS

| | | | |
|---|---|---|---|
| 59-203767 | 11/1984 | Japan | 501/118 |
| 811985 | 4/1959 | United Kingdom | 501/120 |
| 1535202 | 12/1978 | United Kingdom | . |

OTHER PUBLICATIONS

Derwent Abstract 49066T-L.
Derwent Abstract 90097A/50.

(List continued on next page.)

Primary Examiner—William R. Dixon, Jr.
Assistant Examiner—Andrew B. Griffis
Attorney, Agent, or Firm—Paul D. Hayhurst

[57] ABSTRACT

Synthetic raw materials are used to prepare a sintered refractory body consisting essentially of doped cordierite having from about 47.5 to about 56 weight percent SiO$_2$, from about 31 to about 40 weight percent Al$_2$O$_3$, from about 12 to about 19 weight percent MgO, from about 0.15 to about 1 weight percent CaO, from zero to 250 ppm Na$_2$O, and from zero to about 150 ppm K$_2$O, the body having a flexural strength of at least about 20,000 psi (about 140 MPa).

20 Claims, 1 Drawing Sheet

EFFECT OF CaO DOPING ON STRENGTH

U.S. PATENT DOCUMENTS

| | | | |
|---|---|---|---|
| 4,304,585 | 12/1981 | Oda et al. | 65/43 |
| 4,339,421 | 7/1982 | Schultess et al. | 423/330 |
| 4,367,292 | 1/1983 | Sano et al. | 501/119 |
| 4,379,109 | 5/1983 | Simpson | 264/60 |
| 4,403,017 | 9/1983 | Bind | 428/702 |
| 4,413,061 | 11/1983 | Kumar et al. | 501/7 |
| 4,426,342 | 1/1984 | Dria | 264/109 |
| 4,434,117 | 2/1984 | Inoguchi et al. | 264/56 |
| 4,451,516 | 5/1984 | Kato | 501/9 |
| 4,476,236 | 10/1984 | Inoguchi et al. | 501/118 |
| 4,485,182 | 11/1984 | Enomoto et al. | 501/151 |
| 4,489,774 | 12/1984 | Ogawa et al. | 501/128 |
| 4,495,118 | 1/1985 | Ikami | 264/25 |
| 4,496,506 | 1/1985 | Sakato et al. | 264/109 |
| 4,496,509 | 1/1985 | Kita et al. | 264/175 |
| 4,540,621 | 9/1985 | Eggerding | 428/209 |
| 4,545,924 | 10/1985 | Ritter, II | 252/315.7 |
| 4,579,703 | 4/1986 | Adlerborn et al. | 264/58 |

OTHER PUBLICATIONS

Proc. Br. 9), pp. 53-71, R. Morrell, "The Mineralogy and Properties of Sintered Cordierite Glass-Ceramics".

Mat. Res. Soc. Symp. Proc., vol. 73 (1986), J. R. Moyer, A. R. Prunier, Jr., N. N. Hughes, R. C. Winterton, "Synthesis of Oxide Ceramic Powders by Aqueous Coprecipitation", pp. 117-122.

Ceramic Abstracts 62:4645.
Ceramic Abstracts 63:6203.
Ceramic Abstracts 63:6306.
Ceramic Abstracts 64:173.
Ceramic Abstracts 61:4418.
Ceramic Abstracts 62:912.
Ceramic Abstracts 60:1987.

Am. Cer. Soc. Bull. 63 (5), 705-710, 714 (1984), Bernard H. Mussler and Merrill W. Shafer, "Preparation and Properties of Mullite-Cordierite Composites".

Proc. Symp. Electromagn. Windows, ed. by Bassett et al., 165-169 (1980), D. Lewis and J. R. Spann, "Assessment of New Radome Materials as Replacements for Pyroceram 9606".

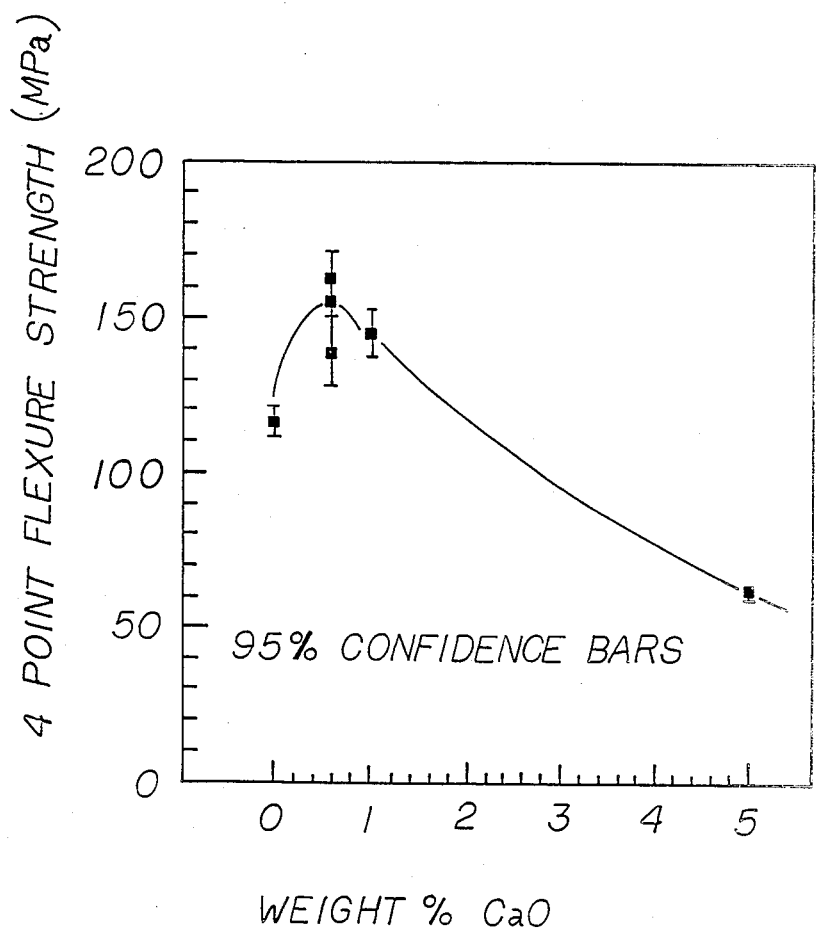

STRENGTHENED CORDIERITE HAVING MINOR AMOUNTS OF CALCIA

BACKGROUND OF THE INVENTION

This invention relates to sintered bodies prepared from synthetic cordierite.

The industrial importance of cordierite (2 $MgO$:2 $Al_2O_3$:5 $SiO_2$) lies in the fact that bodies made of cordierite are characterizable as having a very low thermal expansion over a wide range of temperatures, a high thermal shock resistance when subjected to abrupt temperature changes, and very low dielectric and loss constants at high frequencies. Typically, cordierite bodies may have thermal expansion as low as $0.5 \times 10-6/°C$. in the range of 0° C. to 500° C. and dielectric constants as low as 4.8–5.0 at frequencies of 1 MHz. Industrial uses for cordierite, therefore, include refractory heat plates, honeycomb structures for cleaning exhaust gas from automobiles, radomes and electronic circuit substrates.

The use of cordierite in radomes and electronic circuit substrates takes advantage of the low dielectric constant of cordierite. However, many known cordierite compositions contain impurities, such as alkali metals and/or transition metals, which degrade dielectric properties. Typically, these impure cordierite compositions are those prepared from natural starting materials such as talc and clay. The preparation of cordierite from natural starting materials is disclosed in, e.g., U.S. Pat. Nos. 2,599,184; 3,885,977; 3,958,058; 3,967,971; 4,125,408; 4,194,917; 4,268,311; 4,434,117; and 4,476,236.

Other processes for the preparation of cordierite use, e.g., mixed oxides, glass, or alkoxides or mixtures thereof as the starting material. These approaches do not necessarily require alkali metals or transition metals. However, one of the chief difficulties associated with pure cordierite is its extremely poor sinterability. The approach usually taken to overcome the poor sinterability of pure cordierite is the addition of one or more additional components which either promote liquid phase sintering or, in the case of glass powders, may lower the viscosity of the powder. Almost all the alkali and alkaline earths have been investigated as sintering aids. However, it is generally recognized that small amounts of calcium oxide, also called calcia, are undesirable or have no effect. For example, U.S. Pat. No. 3,926,648 discloses at column 3 that a glass composition based upon the cordierite stoichiometry, to which was added 0.95 percent calcia, resulted in a sintered body which exhibited only from 1-3 percent shrinkage and "poor" strength. U.S. Pat. Nos. 3,979,216 and 4,235,855 disclose cordierite ceramic bodies wherein the total concentration of the alkaline earths calcium, strontium and barium is required to be below about 600 ppm, and below about 200 ppm per individual alkaline earth. U.S. Pat. No. 2,731,355 discloses a magnesium aluminum silicate and attributes the superior qualities thereof in part to the absence of calcia. Morrell, R. in *Proceedings of the British Ceramic Society*, No. 28, pages 53–71, June 1979, reported low theoretical densities of bodies prepared by adding 0.2 and 0.4 percent calcia to glass powder having the composition of cordierite. U.S. Pat. No. 4,367,292 discloses a process for the preparation of a powder which upon firing is converted to cordierite, and that the presence of impurities, particularly calcium oxide and alkalis, has an adverse effect upon the ability of the material to resist thermal shocks.

In the preparation of cordierite bodies from molten glass to produce glass-ceramic bodies, it is common to employ additives. For example, U.S. Pat. No. 3,450,546 discloses the preparation of transparent sintered glass-ceramic articles, having α-cordierite as the principal crystalline phase, produced by mixing particulate glasses consisting essentially of magnesia, alumina and silica. However, it is further disclosed that the base glass composition is compatible with small amounts of certain metal oxides which are beneficial as melting aids, and which improve the clarity of the product. It is taught that the total of these extraneous oxides should not exceed 10 percent by weight, the oxides being $CaO$, $SrO$, $BaO$, $La_2O_3$, $PbO$, $P_2O_5$, $ZnO$ and $B_2O_3$. Similarly, U.S. Pat. No. 3,480,452 teaches the preparation of a crystalline glass-ceramic material formulated from two glass frits, the first frit consisting substantially of silica, alumina and magnesia, and a second bonding frit consisting substantially of silica, alumina, magnesia and from 3.6–8.7 percent each of calcia and baria. U.S. Pat. No. 4,451,516 discloses a ceramic article comprising a plurality of ceramic parts bonded into a monolithic structure using glass-ceramics consisting mainly of magnesia, alumina, silica, 0.1–3.0 percent of $BaO$ and 0.01–1.0 percent of $ZrO_2$. It is further disclosed that the bonding glass may contain $CaO$, $TiO_2$, $Fe_2O_3$, $K_2O$, $Na_2O$, $MoO_3$, $B_2O_3$, $CuO$ and the like in a total amount of not more than 10 percent.

It would be desirable to have a cordierite body having very low impurity levels and high flexural strength. The low levels of impurities would be desirable in that the cordierite body would have a low dielectric constant similar to that of undoped cordierite. The high strength would be desirable in that it would allow the use of thinner parts, would allow use in applications in which high resistance to stress is required, and would impart high thermal shock resistance to the cordierite body.

SUMMARY OF THE INVENTION

The present invention is such a refractory body, and is prepared in a manner such that it contains doped cordierite having from about 47.5 to about 56 weight percent $SiO_2$, from about 31 to about 40 weight percent $Al_2O_3$, from about 12 to about 19 weight percent $MgO$, from about 0.15 to about 1.0 weight percent $CaO$, from 0 to about 250 ppm $Na_2O$, and from 0 to about 150 ppm $K_2O$, the cordierite being prepared using synthetic raw materials, the body having a flexural strength of at least about 20,000 psi as measured using a 4 point bend test.

Heretofore, a strong, low dielectric constant doped cordierite having from about 0.15 to about 1 weight percent calcia has not been disclosed. Such a doped cordierite material would be desirable for many reasons, as described hereinabove. Surprisingly, the use of relatively pure raw materials in conjunction with small amounts of calcia allows the production of sintered, doped cordierite refractory bodies having improved flexural strength.

BRIEF DESCRIPTION OF THE DRAWING

FIG. 1 is a plot of flexural strength, as measured using the 4 point flexure or bending test of Military Standard MIL-STD-1942(MR), versus weight peroent CaO in cordierite bodies.

DETAILED DESCRIPTION OF THE INVENTION

The sintered cordierite body of the present invention is prepared from a mixture of synthetic cordierite precursor powder and calcia precursor powder.

A. Preparation of Cordierite Precursor Powder

A synthetic cordierite precursor powder, in the form of a finely divided, homogeneous powder, is employed in the present invention. Theoretically, cordierite is composed, by weight, of 13.7 percent MgO, 34.9 percent $Al_2O_3$, and 51.4 percent $SiO_2$. Generally, on an oxide basis, the synthetic cordierite precursor powder contains from about 12 to about 19 percent by weight MgO, from about 31 to about 40 percent by weight $Al_2O_3$, and from about 47.5 to about 56 percent by weight $SiO_2$.

Generally, the preferred method of forming the cordierite precursor powder involves substantially simultaneously contacting together in an aqueous medium the following raw materials:

1. a water-soluble magnesium salt;
2. a water-soluble aluminum salt;
3. a silicon source; and
4. a hydroxyl ion source.

The raw materials are mixed in desired proportions to achieve upon firing the desired composition, which preferably is an approximately stoichiometric cordierite composition.

Examples of water-soluble magnesium salts include, for example, magnesium halides such as magnesium chloride and magnesium bromide, magnesium oxalate, magnesium nitrate and magnesium sulfate. Magnesium nitrate is preferred because the nitrate anion is easily removed during calcining and leaves little residue. Mixtures of magnesium salts can be employed.

Examples of water-soluble aluminum salts include, for example, aluminum halides such as aluminum chloride, aluminum bromide, aluminum fluoride, aluminum nitrate, and aluminum sulfate. Aluminum nitrate is preferred. Mixtures of aluminum salts can be employed.

The silicon source employed can be any inorganic, essentially alkali-free silicon source such as colloidal silica which is preferred. Preferably, the silicon source is colloidal silica which is as free as is practical of alkali metal ions, particularly sodium ions. Mixtures of silicon sources can be employed.

The purpose of the hydroxyl ion source is to induce precipitation of the components of cordierite. Preferably, the hydroxyl ion source will not leave a residue or impurity in the precipitate. For example, ammonium hydroxide can be employed as the hydroxyl ion source. Ammonium hydroxide can be generated in situ by bubbling gaseous ammonia through the aqueous medium.

The method of forming the cordierite precursor powder can be carried out under batch or continuous conditions using equipment commonly used for such processes. In carrying out this method, the raw materials are added substantially simultaneously as aqueous solutions, or as a water-like slurry or suspension in the case of colloidal silica, to an aqueous medium maintained at a pH of at least about 8 in a manner which is sufficient to form a precipitate. Preferably, a pH of at least about 8.5 is employed.

Preferably, the raw materials are separately mixed in an aqueous medium, such as water, and then the separate aqueous mixtures are substantially simultaneously introduced into a reaction vessel containing an aqueous medium, such as, for example, an aqueous ammonium hydroxide solution, where a precipitate is formed. The precipitate is then separated from the aqueous medium and dried using known methods to form a powder composition for cordierite production. Preferred drying methods include, for example, tumble drying, oven drying, pan drying, and spray drying, which is more preferred.

The powder composition which is obtained by the method described hereinabove is a homogeneous, uniform, super-fine aotive powder having an average particle diameter of up to about 10 microns. The powder preferably is calcined to lower the surface area by heating at a temperature of from about 500° C. to about 150° C. The surface area of the powder can be reduced by calcining to a surface area in the range of, for example, about 1 $m^2/g$ to about 50 $m^2/g$. The calcined synthetic cordierite precursor powder can be combined with CaO as described herein for the fabrication of ceramic bodies.

B. Preparation of Final Powder and Sintered Body

The synthetic cordierite precursor powder is blended with a calcia source. The calcia source preferably is a water-soluble calcium compound, such as, for example, calcium carbonate, calcium nitrate, calcium hydroxide, calcium sulfate, or calcium oxalate, with calcium nitrate being most preferred. Mixtures of calcia sources can be employed. Calcia can be employed as all or part of the calcia source. Preferably, the calcia source is calcia or a material which essentially completely converts to calcia upon calcination. The calcia source is employed in an amount which is sufficient to give the desired amount of calcia upon subsequent calcination.

In a preferred procedure, the synthetic cordierite precursor powder is added to an aqueous solution of the calcia source to form a thick slurry. Typically, from about 400 to about 2,000 ml or more of water are employed per kilogram of powder. Preferably, from about 600 to about 1,200 ml of water are employed per kilogram of powder. The powder and the aqueous solution are then mixed for a time sufficient to give a well-mixed, homogeneous slurry.

The mixed slurry is then dried and calcined at a temperature sufficient to yield a powder with a surface area which preferably is between about 1 and about 10 square meters per gram. Preferably, the calcining is conducted at a temperature of from about 1000° C. to about 1150° C. The calcined powder is then formed into a green, i.e., unfired, body using any suitable method known in the art. Examples of suitable forming methods include dry pressing, slip casting, tape casting, extrusion and injection molding.

Additives, such as plasticizers, binders, solvents, dispersants, surfactants, etc., which are conventionally employed in the formation and handling of green parts typically are not required to form the green parts of the present invention. However, such additives optionally can be employed if desired. These additives are well known and a wide range of each can be employed. Examples of typical plasticizers include glycols, such as propylene glycol; phthalic esters, such as dioctyl phthalate and benzyl butyl phthalate; and long-chain aliphatic acids such as oleic acid and stearic acid. Mixtures of additives can be employed. Examples of binders include cellulose ethers and derivatives thereof, and long-chain thermoplastic polymers such as polyvinylbutyral, polyvinylacetate, polymethylmethacrylate, polyvinylalcohol, polyvinylformal, and the like. Examples of typical surfactants include the amine salts of alkyl aryl sulfonates; the alkyl ethers of polyethylene glycol, such as the ethyl ether of polyethylene glycol; alkyl aryl polyether alcohols, such as ethylphenyl glycol; polyoxyethylene acetate, or other polyoxyethylene esters; and the like. The additives are employed in amounts and methods which are well known in the art. For example, see the teachings of U.S. Pat. Nos. 4,540,621 and 4,235,855, the teachings of which regarding additives such as binders, plasticizers, dispersants, solvents, surfactants, and the like are incorporated herein by reference. Preferred forming and handling additives are those which are of such a nature that they are volatilized during firing.

If a green ceramic body is formed by a process requiring additives such as binders, plasticizers, lubricants, dispersants, surfactants or other such additives as are known to those skilled in the art, then those additives preferably are substantially completely removed before final densification of the ceramic body. For example, polymer additives are often removed by heating in air, oxygen or under vacuum at temperatures of 200° to 700° C. for times of from about 1 to about 60 hours, as is well known to those skilled in the art. Other methods of removing polymer additives, such as dissolving in an appropriate organic solvent, are also known. The density of the green body without the handling and forming additives typically is from about 50 to about 65 percent of the theoretical density.

After all the handling and forming additives are removed, the CaO modified green body can be densified using known techniques. Sintering is the preferred densification method. For example, firing or sintering the green body to temperatures of from 1380° to 1440° C., using either simple or complex heating schedules, and holding at the maximum temperature for times, for example, of at least about ½ hour typically results in a dense ceramic body predominantly consisting of hexagonal cordierite. The density of such a sintered cordierite refractory body preferably is greater than 96 percent of the theoretical maximum, i.e. there will be less than 4 percent by volume of pores in the final body.

When a synthetic cordierite precursor powder and a calcia source are contacted as described hereinabove and sintered, there is formed a refractory body consisting essentially of doped cordierite having from about 47.5 to about 56 weight percent $SiO_2$, from about 31 to about 40 weight percent $Al_2O_3$, from about 12 to about 19 weight percent MgO, from about 0.15 to about 1.0 weight percent CaO, from 0 to about 250 ppm $Na_2O$, from 0 to about 150 ppm $K_2O$, and a flexural strength of at least about 20,000 psi as measured using a 4 point bend test. Typically the product is polycrystalline and nontransparent. Preferably, the refractory body is essentially free of microcracks. Typically, the refractory body is substantially α-cordierite, but can be converted to the orthorhombic form of cordierite upon extended heating as is known in the art. The refractory body is prepared from synthetic cordierite precursor powder, and exhibits low residual grain boundary amorphous phase(s).

More preferably, the refractory body contains from about 48.7 to about 54.1 weight percent silica, from about 32.6 to about 37.7 percent alumina, and from about 12.8–16.6 percent magnesia. The most preferred refractory bodies have from about 50.3 to about 52.2 percent silica, from about 34.3 to about 35.7 percent alumina, and from about 13.3 to about 14.6 percent magnesia. The preferred range of calcia is from about 0.25 to about 0.75 weight percent, based on the weight of the body; and most preferably is from about 0.4 to about 0.6 weight percent.

The synthetic raw materials employed in the preparation of the refractory body of the present invention preferably are very pure. Thus, the refractory body is very pure and is composed substantially of $SiO_2$, $Al_2O_3$, MgO and CaO in the proportions recited herein. However, certain small amounts of impurities may be present. Preferably, the total alkali metal content, measured as alkali metal oxides, is less than about 750 ppm, and more preferably is less than about 500 ppm. The preferred level of $Na_2O$ is less than about 250 ppm, and more preferably is less than about 150 ppm. The preferred level of $K_2O$ is less than about 150 ppm.

The preferred content of transition metals, measured as the oxides, is less than about 500 ppm, more preferably is less than about 200 ppm, and most preferably is less than about 100 ppm.

The preferred alkaline earth metal content, measured as the oxides, other than MgO and CaO, is less than about 0.3 weight percent, more preferably is less than about 1000 ppm, and most preferably is less than about 500 ppm.

The mean flexural strength of the refractory body of the present invention preferably is at least about 20,000 psi (about 140 MPa), and most preferably is at least about 22,500 psi (about 155 MPa). The refractory body of the present invention preferably has a dielectric constant of less than about 5.2, and more preferably has a dielectric constant of less than about 5.0, as measured at 1 MHz and 25° C. Preferably, the fired density is at least about 96 percent of the theoretical density.

A particularly preferred sintered, isotropic, homogeneous, refractory body of the present invention comprises doped cordierite having from about 50.3 to about 52.2 weight percent $SiO_2$, from about 34.3 to about 35.7 weight percent $Al_2O_3$, from about 13.3 to about 14.6 weight percent MgO, from about 0.4 to about 0.6 weight percent CaO, less than about 500 ppm total alkali metal oxides, less than about 100 ppm total transition metal oxides, and less than about 500 ppm total alkaline earth metal oxides other than CaO and MgO, these weights being calculated on the basis of the total weight of the body, the cordierite body being prepared using synthetic raw materials, the body having a flexural strength of at least about 20,000 psi.

SPECIFIC EMBODIMENTS

The following examples are included for illustrative purpose only, and are not intended to limit the scope of the invention or claims. All parts and percentages are by weight unless otherwise specified.

Preparation 1

Synthetic Cordierite Precursor Powder

A 5 gallon (22.7 liter) baffled, plastic tank equipped with an overhead agitator is half filled with distilled water. As the water is being vigorously agitated, separate distilled water solutions of 10 weight percent $Mg(NO_3)_2$, and 20 weight percent $Al(NO_3)_3$, as well as a 10 weight percent water dispersion of colloidal silica (the silica is available from E. I. Du Pont de Nemours and Company under the trade name LUDOX AS grade silica) are simultaneously pumped into the tank via individual dip tubes. Gaseous ammonia is simultaneously bubbled into the tank through another dip tube. The dip tubes are physically set and arranged to discharge near the impeller section of the agitator.

Pumping of the Mg(NO$_3$)$_2$, Al(NO$_3$)$_3$ and SiO$_2$ feeds is adjusted to provide the relative rates of each required to give a respective Mg/Al/Si mole ratio of 2:4:5 in the tank. Sufficient ammonia is bubbled into the tank to constantly maintain the pH of the aqueous reaction mass at a value between 9.0 and 9.5. This causes, in literally quantitative and gravimetric deposition, Mg(OH)$_2$ and Al(OH)$_3$ to precipitate on and cling tightly to the colloidal SiO$_2$ particles dispersed throughout the reaction mass. The total flow rate of the solutions being fed to the reactor is fixed to provide an average residence time of 4 hours.

The pumping and bubbling continues for 16 hours to ensure that the reaction mass reaches steady state precipitation conditions. Then, the precipitator slurry overflowing the tank is collected for one or more hours. The slurry is allowed to settle, after which it is filtered and washed with distilled water, the pH of which has been adjusted to between 9.0 and 9.5 by the addition of ammonium hydroxide. After the washing is complete, the powder is dried.

Comparative Experiment 1

(Not an Embodiment of the Present Invention)

A cordierite precursor powder is prepared following the procedure of Preparation 1. This coprecipitated hydroxide powder has a bulk composition of 14.10 weight percent MgO, 35.37 weight percent Al$_2$O$_3$, and 50.53 weight percent SiO$_2$. The powder is calcined in air at a temperature of 1070° C. for 4 to 16 hours until it has a surface area of 31 m$^2$/gm.

The resulting calcined cordierite (1000 gm) is mixed with 1500 ml of distilled water and 5 ml of an ammonium polyelectrolyte (available under the trade name DAXAD 32 from W. R. Grace and Company). This mixture or "slip" is ball-milled in a 5 liter alumina jar for approximately 20 hours.

Due to the high surface area needed for sintering of this pure cordierite composition, it is difficult to form green shapes which can be handled without cracking unless polymeric binders and other additives are employed. Therefore, the slip is combined with the following materials:

15 ml of Polyglycol P1200 (a defoaming agent available from The Dow Chemical Company);

3 gm (as a 33 percent solution in H$_2$O) of ammonium citrate as a dispersant;

6 gm (as a 10 percent solution in H$_2$O) of Gelvatol 20-30 PVA (available from Monsanto Company) as a binder;

3 gm (as a powder) of polyvinyl pyrrolidine (available from Eastman Chemical Products, Inc.) as a plasticizer;

10 gm (as a 5 percent solution in H$_2$O) of Methocel ® K35LV (available from The Dow Chemical Company) as a binder; and 0.5 gm (as a powder) of magnesium stearate as a lubricant.

This formulation is milled another 18 hours. Additional distilled water (400 ml) is then added and mixed thoroughly. The resulting slip is vacuum cast in a funnel separator using 2 layers of #42 Whatman filter paper. The resulting approximately 82 mm diameter filter cake disks are dried and then fired 2 days at 150° to 580° C. to burn off the binder and additives. The average green density is 0.930 gm/cc (33 percent of the 2.85 gm/cc density of the powder).

The disks are fired as follows:
½ hour @ 160° C.
3 hours @ 160° to 1070° C.
3 hours @ 1070° to 1250° C.
1.5 hour @ 1250° to 1420° C.
2 hours @ 1420° C.
4 hours @ 1420° to 25° C.

After firing these disks are essentially hexagonal cordierite as determined by X-ray diffraction. Five of these disks are cut and machined into 32 modulus of rupture specimens having the dimensions 3×4×48 mm (rectangular bars). Density measurements on these bars show a mean value of 2.44 gm/cc, or 96 percent of theoretical density as determined by point counting of porosity. They are tested in 4 point flexure in accordance with military testing standard MIL-STD-1942 (MR). Their mean strength is 117 MPa (17,000 psi) with a 95 percent confidence interval of ±5 MPa (±700 psi) for the mean based on Student's t-statistics.

EXAMPLE 2

CaO Doped Cordierite

A coprecipitated cordierite precursor powder of composition 14.02 weight percent MgO, 33.66 weight percent Al$_2$O$_3$ and 52.32 weight percent SiO$_2$ is prepared using the method of Preparation 1. After drying, the precursor powder is calcined for 4 to 16 hours at 700° C. A 1000 gm batch of CaO doped cordierite having 0.5 weight peroent CaO is prepared by dissolving 21 grams of Ca(NO$_3$)$_2$.4H$_2$O in 800 ml of distilled water to form a solution, adding 995 grams of the calcined precursor powder to the solution, mixing until homogeneous, and drying overnight in air at 70° C., and then at 100° C. for 3 to 4 hours. The dry, CaO doped powder so obtained is calcined for 4 to 16 hours at 1150° C. to obtain a powder of approximately 1 m$^2$/gm surface area. The 1000 gm of powder so obtained is mixed with 1300 ml of distilled water and 4 ml of DAXAD 32 and then is milled in a 5 liter alumina mill jar for about 24 hours. Because of the low surface area of this powder and the moderate size of the cast disks, it is not necessary to add polymeric binders and other additives in order to obtain greenware of sufficient strength to be handled without cracking. However, such binders and other additives as are familiar to those skilled in the art could be added. The resulting slip is then further dispersed with another 4 ml of DAXAD 32 and is vacuum cast in a funnel separator using 2 layers of #42 Whatman filter paper. The resulting approximately 82 mm diameter filter cake disks are dried, but no binder burnout is required since no binder is used. The average green density is 1.62 gm/cc (57 percent of the 2.85 gm/cc density of the CaO doped powder). The disks are fired using the same firing schedule as in Comparative Experiment 1. After firing, these disks are essentially hexagonal cordierite as determined by X-ray diffraction.

Two of these disks are cut and machined into 21 modulus of rupture specimens having the dimensions 3×4×48 mm (rectangular bars). Density measurements on these bars show a mean value of 2.47 gm/cc, or 96.5 percent of theoretical density as determined by point counting of porosity. They are tested in 4 point flexure in accordance with military testing standard MIL-STD-1942(MR). Their mean strength is 158 MPa (22,900 psi)

with a 95 percent confidence interval of ±17 MPa (±2,500 psi) for the mean based on Student's t-statistics. Another of the fired disks, having a porosity of 3.1 volume percent, is used to prepare a 1.000 inch (25.4 mm) diameter×0.078 inch (1.98 mm) thick disk. The capacitance of the disk is measured and the dielectric constant is calculated to be 4.81.

EXAMPLE 3

CaO Doped Cordierite

The coprecipitated and calcined cordierite precursor of Example 2 is used for the starting powder. A 1440 gm batch of CaO doped cordierite having 1.0 weight percent CaO is prepared by dissolving 60.7 gm of Ca(NO$_3$)$_2$.4H$_2$O in 1000 ml of distilled water, adding 1426 gm of the calcined precursor powder, mixing until homogeneous, and drying overnight in air at 70° C. and then for 3 to 4 hours at 100° C. The dry, CaO doped powder so obtained is calcined for 4 to 16 hours at 1130° C. to obtain a powder of approximately 1.5 m$^2$/gm surface area. The 1440 gm of powder so obtained is mixed with 760 ml of distilled water and 5.8 ml of DAXAD 32 and then is milled in a 5 liter alumina mill jar for about 20 hours. After milling, the resulting slip is further dispersed with another 5.8 ml of DAXAD 32 and is vacuum cast in a funnel separator using 2 layers of #42 Whatman filter paper. The resulting approximately 82 mm diameter filter cake disks are dried but no binder burnout is required since no binder is used. The average green density is 1.58 gm/cc (55 percent of the 2.85 gm/cc density of the CaO doped powder). The disks are fired using the same firing schedule as in Comparative Experiment 1. After firing, the disks are predominantly hexagonal cordierite as determined by X-ray diffraction, but the most intense peak of anorthite is just barely discernable.

Four of these disks are cut and machined into 32 modulus of rupture specimens having the dimensions 3×4×48 mm (rectangular bars). Density measurements on these bars show a mean value of 2.53 gm/cc, or 98.5 percent of theoretical density as determined by point counting of porosity. They are tested in 4 point flexure in accordance with military testing standard MIL-STD-1942(MR). Their mean strength is 146 MPa (21,200 psi) with a 95 percent confidence interval of ±7.5 MPa (±1,100 psi) for the mean based on Student's t-statistics. Another of the fired disks, having a porosity of 2.0 volume percent, is used to prepare a 0.999 inch (25.38 mm) diameter×0.035 inch (0.889 mm) thick disk. The capacitance of the disk is measured and the dielectric constant is calculated to be 5.02.

Comparative Experiment 4

CaO Doped Cordierite

(Not an Embodiment of the Present Invention)

The coprecipitated and calcined cordierite precursor of Example 2 is used for the starting powder. A 1080 gm batch of CaO doped cordierite having 5.0 weight percent CaO is prepared by dissolving 227.6 gm of Ca(NO$_3$)$_2$.4H$_2$O in 900 ml of distilled water, adding 1026 grams of the calcined precursor powder, mixing until homogeneous, and drying overnight in air at 70° C. and then for 3 to 4 hours at 100° C. The dry, CaO doped powder so obtained is calcined for 4 to 16 hours at 1100° C. to obtain a powder of approximately 1.0 m$^2$/gm surface area. The 1080 gm of powder so obtained is mixed with 736 ml of distilled water and 4.3 ml of DAXAD 32 and then milled in a 5 liter alumina mill jar for about 22 hours. After milling, the resulting slip is further dispersed with another 8.6 ml of DAXAD 32 and is vacuum cast in a funnel separator using 2 layers of #42 Whatman filter paper. The resulting approximately 82 mm diameter filter cake disks are dried, but no binder burnout is required since no binder is used. The average green density is 1.70 gm/cc (60 percent of the 2.85 gm/oc density of the CaO doped powder). The disks are fired using the same firing schedule as in Comparative Experiment 1 except that the uppermost temperature (1420° C.) is reduced to 1360° C. in order to prevent slumping of the specimens. After firing, these disks are predominantly hexagonal cordierite as determined by X-ray diffraction, but the diffraction peaks of anorthite and spinel are also discernable. Five of these disks are cut and machined into 41 modulus of rupture specimens having the dimensions of 3×4×48 mm (rectangular bars). Density measurements on these bars show a mean value of 2.49 gm/cc, or 93.8 percent of theoretical density as determined by point counting of porosity. They are tested in 4 point flexure in accordance with military testing standard MIL-STD-1942(MR). Their mean strength is 63.6 MPa (9,230 psi) with a 95 percent confidence interval of ±2.4 MPa (±350 psi) for the mean based on Student's t-statistics.

EXAMPLE 5

CaO Doped Cordierite

A cordierite precursor powder is prepared following the procedure of Preparation 1. This coprecipitated hydroxide powder has a bulk composition of 14.46 weight percent MgO, 34.50 weight percent Al$_2$O$_3$, and 51.04 weight percent SiO$_2$. This precursor powder is calcined for approximately 12 hours at 1000° C. before CaO doping. A 1307 gm batch of CaO doped cordierite having 0.5 weight percent CaO is prepared by dissolving 27.4 gm of Ca(NO$_3$)$_2$.4H$_2$O in 900 ml of distilled water, adding 1300.5 gm of the calcined precursor powder, mixing until homogeneous, and drying overnight in air at 70° C., and then for 3 to 4 hours at 100° C. The dry, CaO doped powder so obtained is calcined for 4 to 16 hours at 1145° C. to obtain a powder of approximately 6 m$^2$/gm surface area. The 1307 gm of powder so obtained is mixed with 800 ml of distilled water and then milled in a 5 liter alumina mill jar for about 24 hours. After milling, the resulting slip is split in half, with one of the halves being stored in a plastic bottle for 2 weeks. The half that is not stored is immediately dispersed with 5.2 ml of DAXAD 32 and is vacuum cast in a funnel separator using 2 layers of #42 Whatman filter paper. The resulting approximately 82 mm diameter filter cake disks are dried, but no binder burnout is required since no binder is used. The average green density is 1.80 gm/cc (63 percent of the 2.85 gm/cc density of the CaO doped powder). The disks are fired using the same firing schedule as in Comparative Experiment 1. After firing, these disks are predominantly hexagonal cordierite as determined by X-ray diffraction. Three of these disks are cut and machined into 27 modulus of rupture specimens having the dimensions of 3×4×48 mm (rectangular bars). They are tested in 4 point flexure in accordance with military testing standard MIL-STD-1942(MR). Their mean strength is 166 MPa (24,100 psi) with a 95 percent confidence interval of ±8.4 MPa (±1,200 psi) for the mean based on Student's t-statistics.

The half of the slip that is stored for 2 weeks thickens, but disperses again upon stirring by hand and addition of 7.8 ml of DAXAD 32. The slip is vaouum cast in a funnel separator using 2 layers of #42 Whatman filter paper. The resulting approximately 82 mm diameter filter cake disks are dried, but no binder burnout is required since no binder is used. The disks are fired using the same firing schedule as in Comparative Experiment 1. After firing, these disks are essentially hexagonal cordierite as determined by X-ray diffraction. Three of these disks are cut and machined into 33 modulus of rupture specimens having the dimensions of $3 \times 4 \times 48$ mm (rectangular bars). They are tested in 4 point flexure in accordance with military testing standard MIL-STD-1942(MR). Their mean strength is 142 MPa (20,600 psi) with a 95 percent confidence interval of $\pm 11.2$ MPa ($\pm 1,600$ psi) for the mean based on Student's t-statistics.

Example 5 illustrates the fact that it is possible to store the slips of the present invention for later use, but that it is preferable to cast the slips soon after they are prepared. More mixing of the stored slip may give better dispersion and possibly better strength in refractory bodies prepared therefrom.

Comparative Experiment 6

(Not an Embodiment of the Present Invention)

A coprecipitated hydroxide powder prepared as in Example 5 and having a bulk composition of 14.46 weight percent MgO, 34.50 weight percent $Al_2O_3$, and 51.04 weight percent $SiO_2$, is used, except that unlike the preceding Examples and Comparative Experiments, the CaO doping is performed *before* the precursor powder slurry is dried or calcined. A CaO doping solution is prepared by dissolving 50.0 gm of $CaCO_3$ into 1000 ml of formic acid plus distilled water. After precipitation and washing of the cordierite precursor powder slurry, but before drying, enough of the CaO doping solution is added to the slurry to result in an oxides basis doping level of 0.5 weight percent CaO. The doped slurry is then dried and the precursor powder obtained is calcined for 4 hours at 1140° C.

A 1596 gm sample of this powder is mixed with 840 ml of distilled water and 12.8 ml of DAXAD 32, and then is milled in a 5 liter alumina mill jar for 39 hours. After milling, the slip is dispersed with another 6.4 ml of DAXAD 32 and is vacuum cast in a funnel separator using 2 layers of #42 Whatman filter paper. The resulting approximately 82 mm diameter filter cake disks are dried, but no binder burnout is required since no binder is used. The average green density is 1.70 gm/cc (60 percent of the 2.85 gm/cc density of the CaO doped powder). The disks are fired using the same firing schedule as in Comparative Experiment 1. After firing, these disks are essentially hexagonal cordierite as determined by X-ray diffraction. However, these fired disks are also porous and absorb water. Their fired densities have an average value of 2.33 gm/cc, or only 91 percent of the theoretical maximum attainable as is confirmed by point counting of porosity. Such low densities are unsuitable for most ceramic applications; therefore, strength values were not determined.

What is claimed is:

1. A sintered, isotropic refractory body consisting essentially of doped cordierite having from about 47.5 to about 56 weight percent $SiO_2$, from about 31 to about 40 weight percent $Al_2O_3$, from about 12 to about 19 weight percent MgO, from about 0.15 to about 1 weight percent CaO, from zero to about 0.3 weight percent total alkaline earth metal oxides other than MgO and CaO, from zero to about 250 ppm $NaO_2O$, from zero to about 150 ppm $K_2O$, and less than about 500 ppm transition metals, on the oxide basis, the cordierite body being prepared using synthetic raw materials, the body having mean flexural strength of at least about 20,000 psi.

2. The body of claim 1 wherein the alkaline earth metal content, on the oxide basis, excluding MgO and CaO, is less than about 1,000 ppm.

3. The body of claim 2 wherein the alkaline earth metal content is less than about 500 ppm.

4. The body of claim 1 wherein the content of transition metals, on the oxide basis, is less than about 200 ppm.

5. The body of claim 4 wherein the content of transition metals, on the oxide basis, is less than about 100 ppm.

6. The body of claim 1 wherein the mean flexural strength is at least about 22,500 psi.

7. The body of claim 1 wherein the dielectric constant is less than about 5.2 measured at 1 MHz and at 25° C., and the density is at least about 96 percent of the theoretical density.

8. The body of claim 1 wherein the total alkali metal content, on the oxide basis, is less than about 750 ppm of the total composition.

9. The body of claim 8 wherein the alkali metal content, on the oxide basis, is less than about 500 ppm of the total composition.

10. The body of claim 1 which contains from about 48.7 to about 54.1 weight percent $SiO_2$, from about 32.6 to about 37.7 percent $Al_2O_3$, and from about 12.8 to about 16.6 percent MgO.

11. The body of claim 10 which contains from about 50.3 to about 52.2 percent $SiO_2$, from about 34.3 to about 35.7 percent $Al_2O_3$, and from about 13.3 to about 14.6 percent MgO.

12. The body of claim 1 wherein the amount of calcia is from about 0.25 to about 0.75 weight percent, based on the total weight of the oxides of Si, Al, Mg and Ca.

13. The body of claim 12 wherein the amount of calcia is from about 0.4 to about 0.6 weight percent.

14. A sintered, refractory body consisting essentially of cordierite having from about 47.5 to about 56 weight percent $SiO_2$, from about 31 to about 40 weight percent $Al_2O_3$, from about 12 to about 19 weight percent MgO, and from about 0.15 to about 1 weight percent CaO, the body having a mean flexural strength of at least about 20,000 psi.

15. A sintered, isotropic refractory body consisting essentially of doped cordierite having from about 50.3 to about 52.2 weight percent $SiO_2$, from about 34.3 to about 35.7 weight percent $Al_2O_3$, from about 13.3 to about 14.6 weight percent MgO, from about 0.4 to about 0.6 weight percent CaO, less than about 500 ppm total alkali metal oxides, less than about 100 ppm total transition metal oxides, and less than about 500 ppm total alkaline earth metal oxides other than CaO and MgO, these weights being calculated on the basis of the total weight of the body, the cordierite body being prepared using synthetic raw materials, the body having a mean flexural strength of at least about 20,000 psi.

16. A process for the preparation of a refractory body, the process comprising:
 (a) preparing a synthetic cordierite precursor powder from synthetic raw materials;

(b) preparing an aqueous slurry of a calcia source and the powder of step (a);
(c) treating the slurry to obtain a dry, calcia-containing powder;
(d) preparing a green body from the powder of step (c), optionally including in the green body one or more forming additives; and
(e) firing the green body to form a refractory doped cordierite body having from about 47.5 to about 56 weight percent $SiO_2$; from about 31 to about 40 weight percent $Al_2O_3$; from about 12 to about 19 weight percent MgO; from about 0.15 to about 1 weight percent CaO; and a mean flexural strength of at least about 20,000 psi as measured using the 4 point bending strength method.

17. The process of claim 16 wherein the calcia source is calcium nitrate.

18. The process of claim 16 wherein the mean flexural strength is at least about 22,500 psi.

19. The process of claim 16 wherein the preparation of the synthetic cordierite precursor powder includes calcining at a temperature of from about 500° C. to about 1150° C.

20. The process of claim 19 wherein the refractory body has from zero to about 250 ppm $Na_2O$ and from zero to about 150 ppm $K_2O$.

* * * * *